United States Patent Office 3,057,869
Patented Oct. 9, 1962

3,057,869
7-CHLORO-4-HYDROXY-6-QUINOLINE-SULFONAMIDE
Robert F. Meyer, Ann Arbor, Mich., assignor to Parke, Davis & Company, Detroit, Mich., a corporation of Michigan
No Drawing. Filed Apr. 11, 1960, Ser. No. 21,104
2 Claims. (Cl. 260—289)

The present invention relates to 7-chloro-4-hydroxy-6-quinolinesulfonamide of the formula

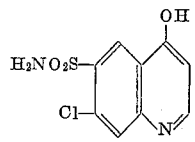

to alkali metal salts thereof, and to methods for the production of such compounds.

In accordance with the invention, 7-chloro-4-hydroxy-6-quinolinesulfonamide and its alkali metal salts can be produced by the hydrolysis of a 7-chloro-4-halo-6-quinolinesulfonamide. The preferred starting material is 4,7-dichloro-6-quinolinesulfonamide, although the corresponding 4-bromo and 4-iodo compounds can also be used. The process of the invention can be carried out by heating the 7-chloro-4-halo-6-quinolinesulfonamide with a relatively strong acid or with a relatively strong base in an equeous medium such as water or an aqueous alkanol. When the process is carried out with a mineral acid such as hydrochloric, sulfuric, hydrobromic, or phosphoric acid, or with a relatively strong organic acid such as p-toluenesulfonic or trifluoroacetic acid, the product obtained is 7-chloro-4-hydroxy-6-quinolinesulfonamide. To avoid competing side reactions relatively anhydrous mineral acids such as sulfuric acid are employed in reaction media containing sufficient water. Sulfuric acid of from about 10% to 70% concentration is a satisfactory hydrolytic medium. Aqueous mineral acids such as concentrated hydrochloric acid can be used as such or following dilution with water. When the process of the invention is carried out with a relatively strong base such as aqueous sodium hydroxide or aqueous potassium hydroxide, the product first formed is an alkali metal salt of 7-chloro-4-hydroxy-6-quinolinesulfonamide which can be isolated as such or can be converted to 7-chloro-4-hydroxy-6-quinolinesulfonamide by acidification. In carrying out the hydrolysis reaction an excess of the acid or base is employed and the mixture is heated from about 80 to 120° C. or at the reflux temperature of the mixture until the hydrolysis is substantially complete. With concentrated hydrochloric acid at the reflux temperature, the hydrolysis is substantially complete within 1 to 5 hours. The process of the invention can also be carried out by treating 7-chloro-4-halo-6-quinolinesulfonamide with a Lewis acid such as boron trifluoride or aluminum chloride, either in the absence of a solvent or in an unreactive solvent such as nitrobenzene followed by pouring the reaction mixture into an aqueous medium, preferably a dilute mineral acid.

7-chloro-4-hydroxy-6-quinolinesulfonamide forms non-toxic alkali metal salts upon treatment with strong alkali metal bases such as sodium hydroxide and potassium hydroxide. Such salts are equivalent to the parent compound for purposes of the invention.

The compounds of the invention have useful pharmacological properties. They are diuretic agents of high activity and they produce a marked increase in cation and chloride ion excretion, as well as in urine volume. The compounds have the further advantage of being effective upon oral administration.

The invention is illustrated but not limited by the following examples.

*Example 1*

A mixture of 5 g. of 4,7-dichloro-6-quinolinesulfonamide and 50 ml. of concentrated hydrochloric acid is heated under reflux with stirring for 2 hours and then cooled. The insoluble product, 7-chloro-4-hydroxy-6-quinolinesulfonamide, is collected on a filter and washed with water. This compound can be further purified by recrystallization from 70% ethanol; pale yellow crystals, melting point higher than 300° C.

The same product is obtained when 100 ml. of 40% sulfuric acid is substituted for the concentrated hydrochloric acid.

If 100 ml. of 50% aqueous ethanol containing 20 g. of sodium hydroxide is substituted for the concentrated hydrochloric acid, the reaction product is the di-sodium salt of 7-chloro-4-hydroxy-6-quinolinesulfonamide. If desired, this product can be converted to 7-chloro-4-hydroxy-6-quinolinesulfonamide by acidification.

*Example 2*

Four g. of 7-chloro-4-hydroxy-6-quinolinesulfonamide and 0.62 g. of sodium hydroxide are dissolved in 200 ml. of 95% ethanol. The solution is evaporated to dryness to yield a residue of 7-chloro-4-hydroxy-6-quinolinesulfonamide monosodium salt. This product is soluble in water.

When 0.87 g. of potassium hydroxide is substituted for the sodium hydroxide in the foregoing procedure, the product obtained is 7-chloro-4-hydroxy-6-quinolinesulfonamide monopotassium salt.

I claim:
1. A member of the class consisting of 7-chloro-4-hydroxy-6-quinolinesulfonamide and alkali metal salts thereof.
2. 7-chloro-4-hydroxy-6-quinolinesulfonamide.

References Cited in the file of this patent
UNITED STATES PATENTS

| | | |
|---|---|---|
| 2,608,557 | Copenhauer | Aug. 26, 1952 |
| 2,886,568 | Stansbury et al. | May 12, 1959 |
| 2,957,883 | Novello | Oct. 25, 1960 |

OTHER REFERENCES

Baker et al.: J. Amer. Chem. Soc., vol. 68, pages 2636–2639 (1946).
Cutler et al.: J. Amer. Chem. Soc., vol. 72, pages 3394–9 (1950).